July 16, 1935.  C. T. WALTER  2,008,090
SLICING MACHINE
Filed July 25, 1932   6 Sheets-Sheet 1

Charles T. Walter
INVENTOR

July 16, 1935.  C. T. WALTER  2,008,090
SLICING MACHINE
Filed July 25, 1932   6 Sheets-Sheet 2

Charles T. Walter
INVENTOR

WITNESS
Wm C. Meiser

BY
ATTORNEY

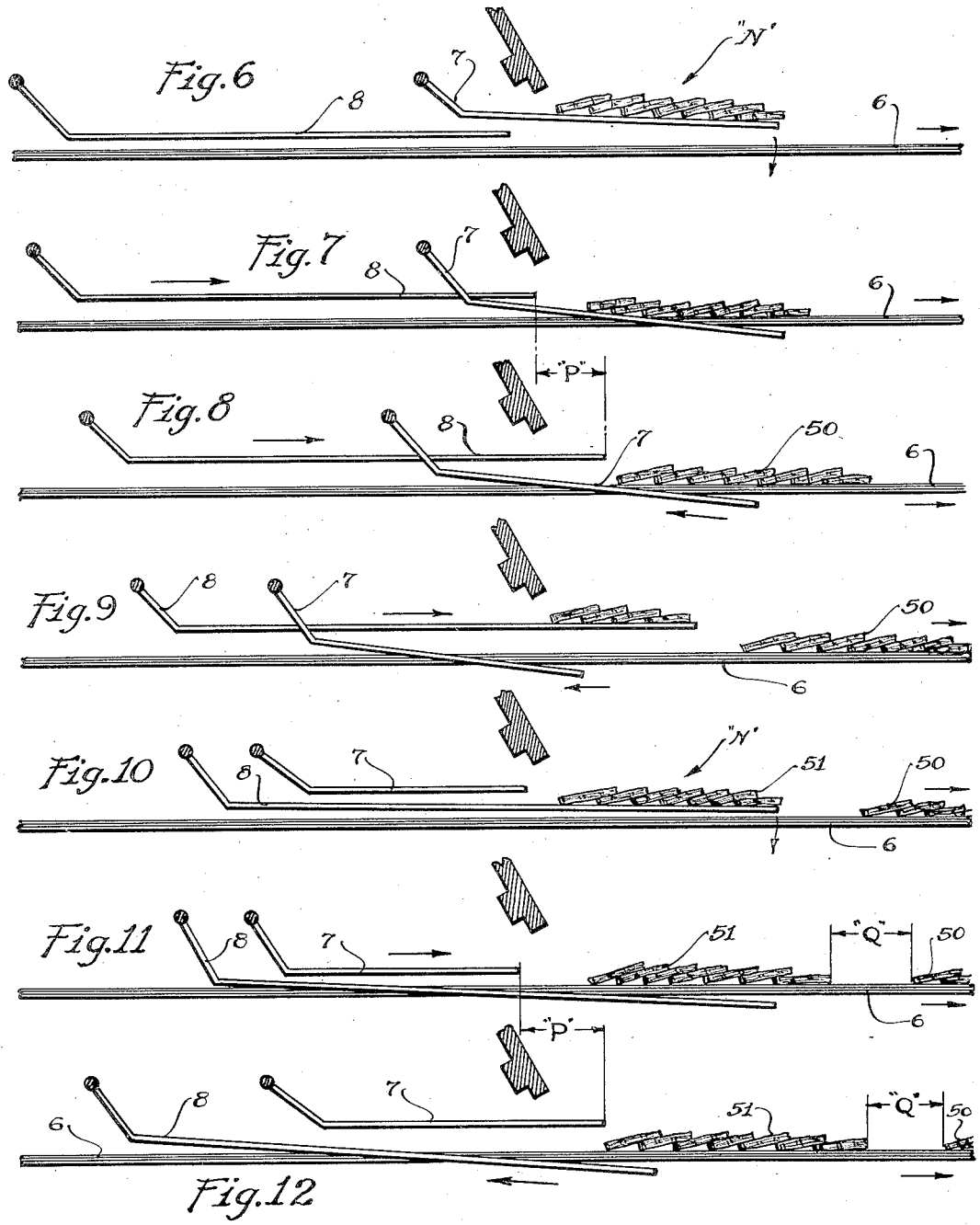

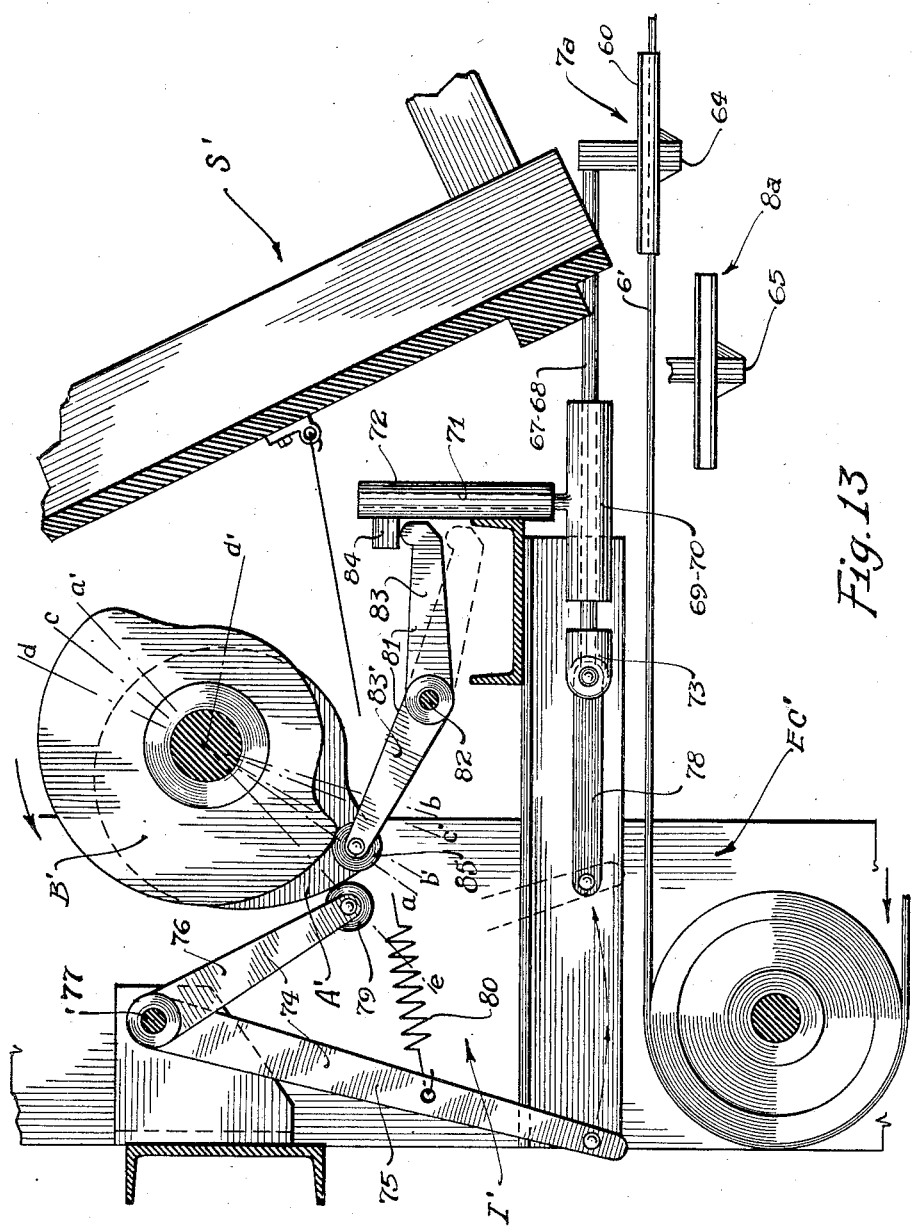

July 16, 1935.　　　C. T. WALTER　　　2,008,090
SLICING MACHINE
Filed July 25, 1932　　　6 Sheets-Sheet 5

WITNESS

Charles T. Walter
INVENTOR

BY

ATTORNEY

Patented July 16, 1935

2,008,090

UNITED STATES PATENT OFFICE 2,008,090

SLICING MACHINE

Charles T. Walter, Chicago, Ill., assignor to Industrial Patents Corporation, Chicago, Ill., a corporation of Delaware Application July 25, 1932, Serial No. 624,415

10 Claims. (Cl. 146—94)

The invention relates to slicing machines particularly adapted for the cutting of slabs of bacon into slices.

One object of the invention is to provide in association with or as part of a slicing machine an intermediate receiving and delivering mechanism that is positioned and operated so as to receive slices of bacon dropped thereupon from the slicing machine in a manner whereby the slices are arranged in overlapping relationship in respect to each other, so as to provide a group or batch of slices thus arranged, and to deliver the groups of slices, one group at a time, to and upon a suitable receptacle or conveyor which may be in the form of an endless traveling conveyor mechanism and according to one aspect of the invention, the main functioning parts of the intermediate receiving and delivering mechanism are arranged in multiple, preferably in duplicate, whereby the cutting operation can be continuously carried out and whereby the main functioning parts of the intermediate receiving and delivering mechanism can have in the main relatively gradual and easy movements and thus avoid long quick return movements which would otherwise be experienced if the functioning parts were not in multiple or duplicate.

According to another aspect of the invention, each set of main functioning parts comprises a receiving and delivering member preferably in the form of a fork or fork-shaped member and the arrangement is in effect such that when one of the forks is being moved progressivly forward so as to receive a slice of bacon dropped thereupon from the slicing machine, the other of the fork-shaped members—if the sets are in duplicate—is being moved progressively rearwardly. In fact, the arrangement as shown is such that when one of the forks or fork-shaped members is being moved downwardly to a position for discharging the group of slices thereupon, and even below the position of discharge, the other fork or fork-shaped member is being moved upwardly and rearwardly and ultimately slightly forwardly to its initial position ready for receiving the next slice when and as it drops from the machine. This last slightly forward movement may be relatively quick as it is important to have the forward end of the receiving and delivering member in position to receive a slice then being severed when it drops.

Another object of the invention is to provide between a slicing machine and an endless conveyor associated therewith and arranged below the delivery end of the machine an intermediate receiving and delivering mechanism provided by a plurality of sets—in effect, duplicate sets—of receiving and delivering mechanisms each of which has a tined fork member arranged to receive slices of bacon dropped thereupon as the result of the cutting operation. These forks are operated so that when one of the forks is in position for receiving slices of bacon, the other one is out of position and the arrangement is also such that these forks are brought successively into operation to receive the slices in overlapping relationship and to thereafter deliver the resultant group of slices then upon the fork to and onto the conveyor. The arrangement preferably is such that a fork member is always in position to receive a slice as and when the slice is severed and drops from the slicing machine.

With these and other objects in view, the invention consists in the novel construction, combination and arrangement of parts hereinafter fully described, illustrated in the accompanying drawings, and pointed out in the claims hereto appended, it being understood that various changes in the form, proportion, and minor details of construction, within the scope of the claims, may be resorted to without departing from the spirit or sacrificing any of the advantages of the invention.

As illustrating certain specific manners in which the invention may be realized, reference is made to the accompanying drawings forming a part of this specification and in which drawings:

Figure 1 is a vertical sectional view showing a slicing machine having a cutter at the forward end thereof and the operating parts for the cutter, a portion of an endless conveyor associated with the slicing machine and having an end thereof located below the delivery end of the machine, and an intermediate receiving and delivering mechanism operated by the mechanism that operates the cutter and in synchronism with the cutter, which intermediate mechanism comprises a duplicate set of receiving and delivering members preferably in the form of forks or fork-shaped members that function one at a time and in succession to receive slices of bacon dropping thereupon from the machine and to deliver the resultant groups of slices therefrom to and upon the conveying mechanism.

Figs. 6, 7, 8, 9, 10, 11 and 12 illustrate the different positions of the different fork members as they pass through their successive cyclic movements.

Fig. 13 is a vertical, longitudinal, sectional view of another form of duplicate intermediate mechanisms for operating the forks.

Figure 1:
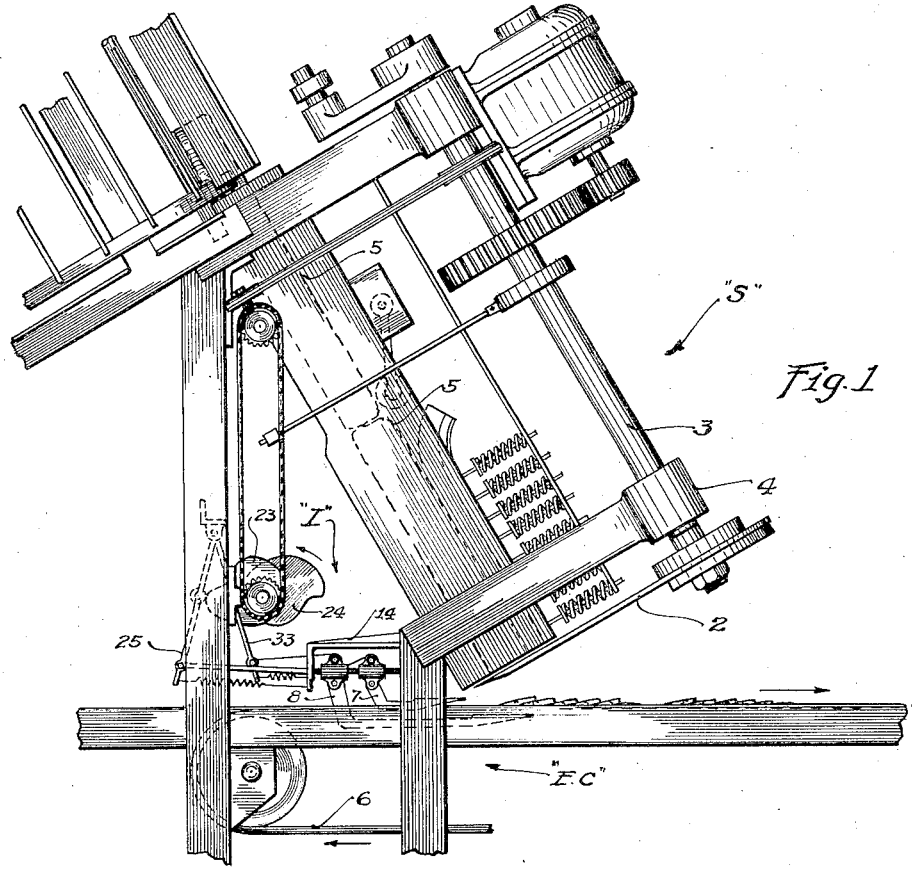

Reference will now be made to the drawings in detail. The slicing machine is designated by S, the endless conveyor below the same is designated by EC and the intermediate receiving and delivering mechanism is designated by I. All of these parts are, of course, mounted and supported by suitable framework. The slicing machine as shown is of the inclined type having suitable means for guiding and feeding slabs of bacon received thereupon forwardly along a longitudinal path to the cutter but it will be noted that while the slicing machine is shown as of the inclined type, any form of slicing machine can be employed and the intermediate receiving and delivering mechanism herein described is adapted to be used with the particular slicing machine shown or any other type. However, it is particularly adaptable for use with the inclined type of machine.

The base or frame of the slicing machine is designated by 1 and a cutting knife 2 is located at the front end of the machine. This knife is mounted on a shaft 3 which in turn is rotatably mounted in bearings 4 carried by or constituting part of the frame of the machine. The slabs of bacon are shown dotted and they are designated by 5 and pass forwardly under the influence of the guiding and feeding mechanism indicated. The particular slicing machine illustrated in the drawings is described and claimed in United States Patent No. 1,993,586 to Joseph Bech, granted March 5, 1935.

Figure 3:
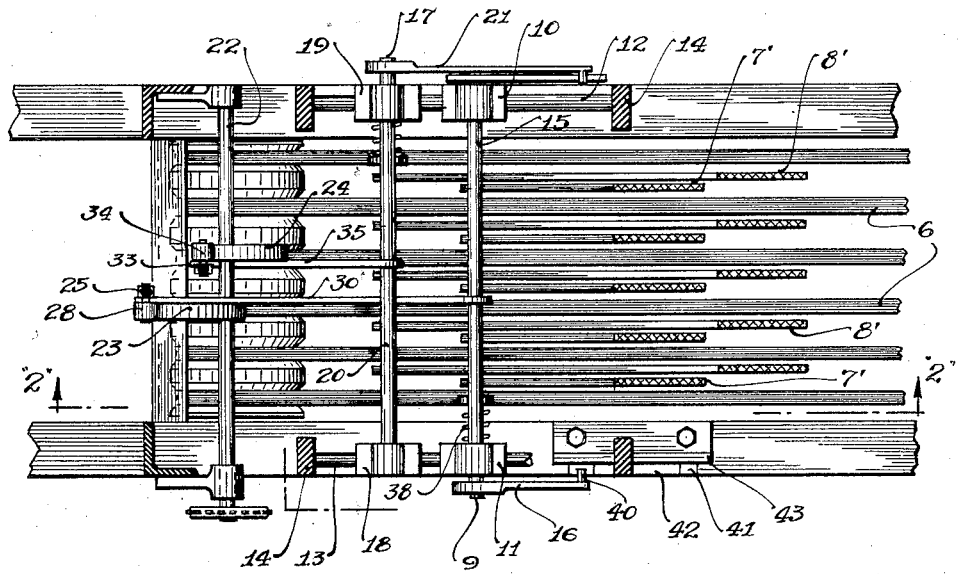
Fig. 3 is a plan view taken as on the broken line 3—3 of Fig. 2, looking in the direction of the arrows.

The conveyor mechanism EC comprises endless belts or strands designated as 6. The conveyor belt as a whole may be considered as made up of narrow strands or belting such as is used in what is commercially known as "Tex-rope" drives or they may be composed of chains or metal ribbons or it may be provided by a single conveyor element having deeply corrugated sections. The supporting portions of the conveyor as a whole are provided by the belt strands which are spaced as indicated in Figure 3 in such a manner as to allow fork elements 7 and 8 to intermesh therewith. These fork elements are the important functioning members of the intermediate receiving and conveying mechanisms herein referred to. The members 7 and 8 are sometimes herein referred to as forks or fork-shaped members and the prongs or tines 7' and 8' thereof constitute the members which actually receive the bacon slices as delivered from the machine and convey groups of slices one after the other when received thereupon to and onto the conveyor.

In the form of apparatus shown in Figures 1 to 12, the fork elements are all rigidly attached to transversely extending shafts corresponding thereto such as shafts 9 and 17. The fork 7 is rigidly attached to shaft 9 which in turn is supported by bearings in longitudinally movable slider elements or sliding members 10 and 11 in opposite sides of the machine. These sliders or sliding members are in turn supported by suitable horizontally extending guides 12 and 13 which are in effect relatively fixed guides that are rigidly supported by a framework 14 which is in turn attached to the slicing frame or other rigid support.

The sliding members 10 and 11 are rigidly connected together by cross rod 15. An arm 16 is rigidly connected to the shaft 9 so that the arm through its motion may in turn control the motion of the individual prong elements or tines of the fork 7. The entire fork assembly, which comprises the shaft 9 rotatably mounted in the sliding members 10 and 11 and the individual fork elements supported on and by the shaft 9, is free to slide lengthwise or longitudinally on the guide members 12 and 13. The fork 7 may be designated as the short fork while the fork 8 may be designated as the long fork.

There has just been described in considerable detail the first or short fork assembly. There will now be referred to the second or long fork assembly. This is made up of the long fork 8 having individual prong elements designated 8' and the fork is rigidly attached to the shaft 17 as previously indicated. The shaft 17 is supported in bearings on the sliders or sliding members 18 and 19 which are in turn coupled together by the cross member or shaft 20. The long fork assembly is substantially identical with that of the short fork assembly excepting as to such changes as are incident to the making of one fork longer than the other. The motion of the fork-carrying shaft 17 is controlled by arm 21. Therefore, the position of arm 21 which functions similarly to arm 16 controls all positions of the tines 8' of the long fork 8.

The operating mechanism for the forks, to wit, the mechanism that operates the sliding members for the forks, comprises a cam shaft 22 rotatably mounted in suitable bearings and this shaft 22 is driven by suitable gearing from the knife-carrying shaft 3 so as to run or operate in synchronism with the knife shaft. There are two cams, 23 and 24, respectively, which are mounted upon and secured to the cam shaft 22. These two cams control the horizontal motion of the short fork and the long fork, respectively. A vibrating arm 25 is pivoted at 26 to a fixed member 27 and this arm 25 carries a roller 28 which is mounted on a pin 29 that is rigidly fastened to the arm 25 and as will hereinafter appear this roller 28 is continuously in engagement with a face portion of the cam 23. At the outer or free end of the arm 25 there is pivotally connected at 31 one end of the link 30, the other end of the link 30 is fastened to the cross member 15 so as to have slight rotatable or angular movement in respect to the cross member 15 of the short fork assembly. A tension spring 32 is connected to the free end of the lever or arm 25 in a manner to cause the roller 28 to follow at all times the contour of cam 23.

An exactly similar linkage arrangement to that just described is utilized to operate the long fork assembly. In other words, it will be noted that an arm 33 is pivotally connected to a fixed member as 27. It carries a roller 34 which is in continuous engagement with the cam 24. The free end of the arm 33 is pivotally connected at 36 to one end of the link 35, the other end of which link is connected to the cross bar 29 of the long fork assembly so as to permit slight rotative or angular movement in respect to the cross bar. A tension spring 37 furnishes the motive power for maintaining the roller 34 in contact with the cam 24. An inspection of the drawings will show that there is a slight difference in formation of the links 30 and 35, the latter being straight, the former being slightly depressed in order to avoid an interference of the link 30 with the cross bar 29.

It will be noted at this point that the cams 23 and 24 are identical but are placed 180 degrees apart on shaft 22. It would be feasible, however, to operate the two fork assemblies by a single cam instead of the two cams shown, the only change necessary to do this being to change one of the lever systems so that the lever and roller mechanism can operate on the opposite side of the cam or 180 degrees from the other roller of the assembly.

Figure 2:
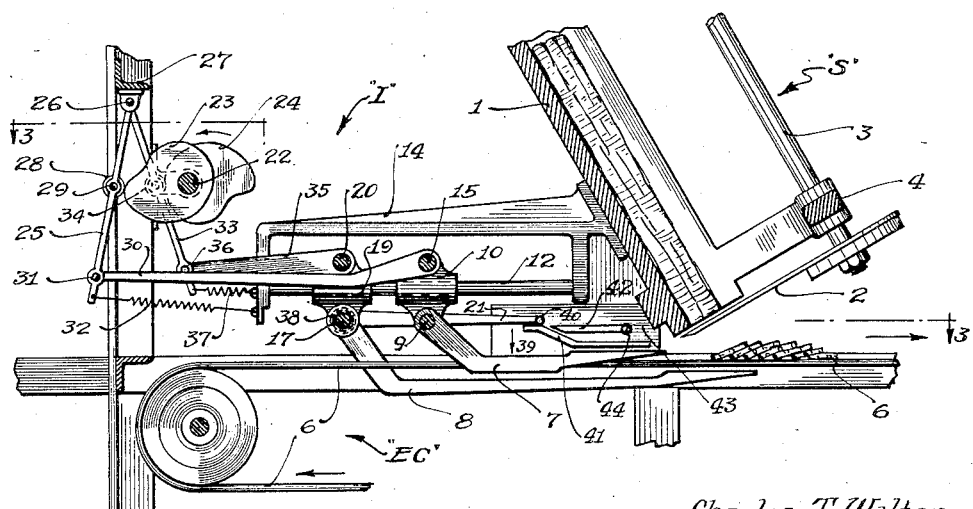
Fig. 2 is a vertical view partly in section—and at a larger scale than is shown in Fig. 1—of the intermediate mechanism in association with the lower forward end of the cutting machine and a portion of the conveyor.

As previously pointed out, the short fork assembly comprises the fork member 7 rigidly mounted on shaft 9 and arm 16 likewise rigidly mounted on shaft 9. These members are free to rotate as a unit in bearings integral with the sliders or sliding members 10 and 11. A suitable spring as coil spring 38 is provided to cause the fork assembly to rotate in a clockwise direction as indicated by the small arrow 39 as shown in Figure 2. This rotative force is balanced by the reaction of a pin frequently herein referred to as guide pin 40 which presses against track elements or guiding elements 41 and 42. These track elements or guideways are supported by a plate 43. The details of these track elements or guideways are clearly indicated in Figure 5 hereof. It will be noted that the track element 42 is pivotally mounted on plate 43 as at 44. This track member 42 is in effect a latch pivotally supported at its forward end. Its extreme opposite end or in other words its free rear end 45 normally rests against an inclined surface 46 of the track element 41. This track mechanism functions as follows: Its purpose is to control the vertical position of the tines or prongs of the fork member 7, due to the action of the spring 38 and the sliding pin 40 which constantly rides or at least almost constantly rides on the track elements. The reference characters A, B, C, D, and E indicate certain important motions of the pin 40 (on the arm with which it is associated) with reference to these track elements or guide members.

Figure 4:
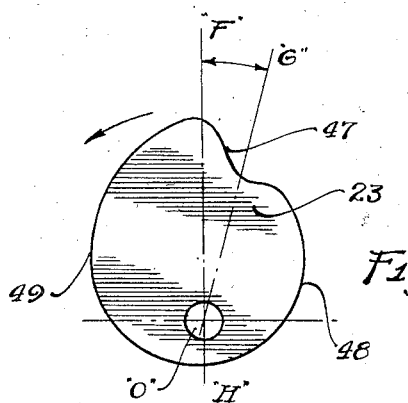
Fig. 4 is a detail view of one of the operating cams shown in Fig. 1.

Assuming that the pin 40 is at the point A, this represents the extreme left hand position of the short fork assembly and is represented by the relative positions of cam 23 on roller 28. It will be noted that the roller 28 is thus at the extreme high point of the cam 23. As the cam 23 continues to rotate in a counterclockwise direction, the lobe 47 of the cam permits the entire short fork assembly to move toward the right under the influence of the tension spring 32. This motion is quite rapid because the cam profile is steep during this angle. This is clearly shown in Figure 4 as will appear by noting the angle FOG. It will be borne in mind that Figure 4 shows at somewhat larger scale than shown in Figures 1 or 2 the construction of the cams 23 and 24. This rapid motion to the right is a relatively short motion and places the short fork assembly in position to receive the first slice of a given group. In other words, it places the fork in what is sometimes herein referred to as the initial receiving position. The extent of this movement is in effect indicated by the line A—B of Figure 5 and the portion of the trackway which is defined by the line A—B may be considered as an upper, short, horizontal section. As the cam 23 continues to rotate through the angle GOH as indicated by Figure 4, the fork assembly is further moved forwardly or toward the right in a manner controlled by the cam surface 48 which may be a uniform spiral or any other desired curve. During this movement, the pin 40 is moved from B to C along the track element 42 or in other words during the entire forward movement, the pin has been moved from A to C.

The movement from B to C is a progressive movement along the upper portion of the guideway as defined and provided for by the latch member 42. During this forward movement of the fork assembly as controlled by the angle GOH of the cam, N number of slices are deposited on the short fork assembly. The spacing of these slices is determined by the profile 48 of the cam 23 as the fork assembly approaches close to the extreme right hand end or forward end of its stroke. During this forward movement, to wit, near the end thereof, the pin 40 travels beyond the forward end of the track element 42 and is free to drop along the path indicated by the line C—D in Figure 5, this being assisted under the influence of the spring 38. It is this dropping motion from C to D that causes the prearranged groups of bacon slices which are supported on the tines of the fork element 7 to be deposited on the conveyor belt 6. In other words, the tines are moved low enough to cause the group of bacon slices to be discharged from the tines of the fork to and upon the spaced receiving and supporting portions of the endless conveyor and these tines continue in their downward movement sufficiently to clear the strips of bacon thus deposited on the conveying element, to wit, as shown in Figure 7. Precisely at the time that pin 40 is dropping from C to D, the long fork assembly as controlled by cam 24—which is set 180 degrees behind the cam 23—is caused to move from its extreme left hand position fairly rapidly to the right to a proper location to receive the first slice of the next group of slices, in other words, to the initial receiving position therefor.

Figure 5:
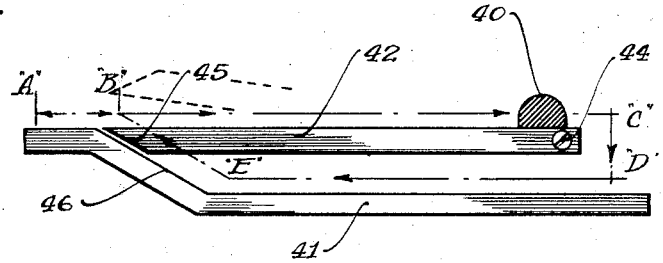
Fig. 5 is a detail view of a guiding mechanism which is relied upon for regulating the position of a fork-shaped member corresponding thereto as it passes through its cyclic movements. There is a guiding member that corresponds to and is provided for each of the fork members.

After the group of slices supported on the short fork 7 has been deposited on the conveyor belt, this fork is ready to be returned to its original position A. This is brought about during the rotation of the cam 23 through 180 degrees of travel, that is, through the angle HOF of Figure 4. This further rotation brings profile 49 of the cam 23 under roller 28. This profile or cam surface may have any desired curve such as a uniform spiral. During this period of cam rotation, the pin 40 is moved longitudinally and rearwardly along a straight line from position D to position E, to wit, along what may be termed as a lower horizontally and longitudinally extending guideway member, thence upwardly and rearwardly from E to B along what may be termed the upwardly and rearwardly inclined guide portion or guideway 46. As the pin 40 moves up the upwardly and rearwardly inclined guideway or portion 46 from E to B, it lifts the free end of the latch or track element 42 swinging the latter upwardly about the pivot point 44. After the pin 40 has reached the position B, it continues to move rearwardly to the left to its extreme rear upper position A. During this motion as soon as it has cleared the end 45 of the track or latch element 42, this track element or latch drops back into its position as indicated in Figure 5 whereat the free end of the latch is supported by the upwardly and rearwardly inclined guide portion 46. As soon as the pin 40 has reached the point A, the mechanism is ready for the repetition of the cycle herein outlined.

As previously indicated, the long fork assembly is operated by an exactly similar mechanism to that just described for the short fork assembly. For simplicity of drawings and description, some of the parts in relation to the long fork assembly are not numbered. It is sufficient to note that the two fork assemblies move through substantially identical cycles with the exception that the two cycles are 180 degrees apart with reference to the cam shaft 22 whereby the fork members each perform their receiving and discharging functions one after the other. The cam lobe FOG, to wit, as indicated by profile or cam surface 47 of Figure 4, must subtend an angle equivalent to less than one complete revolution of the knife shaft 3. The cam surface as defined by the angle GOH plus the angle FOG must be equivalent to N revoluions of the knife shaft 3. Likewise, the remaining portion of the cam surface, to wit, surface 49 must be equal to N number of revolutions of the knife shaft 3.

The several stages of operation of the two fork assemblies in receiving, accumulating and depositing groups of slices from the slicing machine to the conveyor are illustrated in Figures 6 to 12.

In Figure 6, one sees the short fork assembly 7 supporting a group of N number of slices. In the drawings, N is shown as being seven slices but it will be understood that the number of slices for a particular machine can be varied by properly proportioning the machine parts.

In Figure 6, it will further be noted that the short fork 7 has been moved to its full forward position, to wit, to the right, and is about to move downwardly as indicated by the arrow and so as to deposit the slices on the conveyor 6. The long fork assembly 8 is in position to be moved relatively quickly to the right in proper position to receive the next slice from the machine.

Figure 7 shows the short fork 7 in its lowest position with the group of slices resting on the conveyor 6. The long fork assembly 8 has not yet advanced to the right or at the most only a slight amount.

Figure 8 shows the long fork advanced to the right through the distance indicated by P—a distance in effect corresponding to A—B of Figure 4—and in position to receive the first slice of the next group, in other words, to its initial receiving position. In this figure, it will be noted that the group of slices 50 just deposited is moving to the right with the conveyor 6.

Figure 9 shows the long fork 8 somewhere near the middle of its right hand or forward displacement. It will be noted that the short fork 7 is somewhere near the middle point of its left hand or rearward return displacement while the group of slices 50 is still moving way from the long fork assembly 8.

Figure 10 shows the long fork assembly 8 in its extreme right hand or forward position and supporting the full group of N number of slices 51. The long fork 8 is now in the same relative position with the short fork 7, slicing knife, etc., as was the short fork 7 in Figure 6. The next motion of the long fork 8 will be downwardly as indicated by the arrow and this movement will deposit group 51 on the conveyor belt 6.

Figure 11 shows the long fork 8 dropped below the conveyor belt surface with the group of slices 51 resting on the conveyor 6. The short fork 7 is now about to be moved forward relatively rapidly to receive the first slice of the next group.

Figure 12 shows the short fork 7 in position to receive the first slice of the next group and it will now be noted that groups of slices 50 and 51 when on the conveyor are separated by Q.

Figure 14:
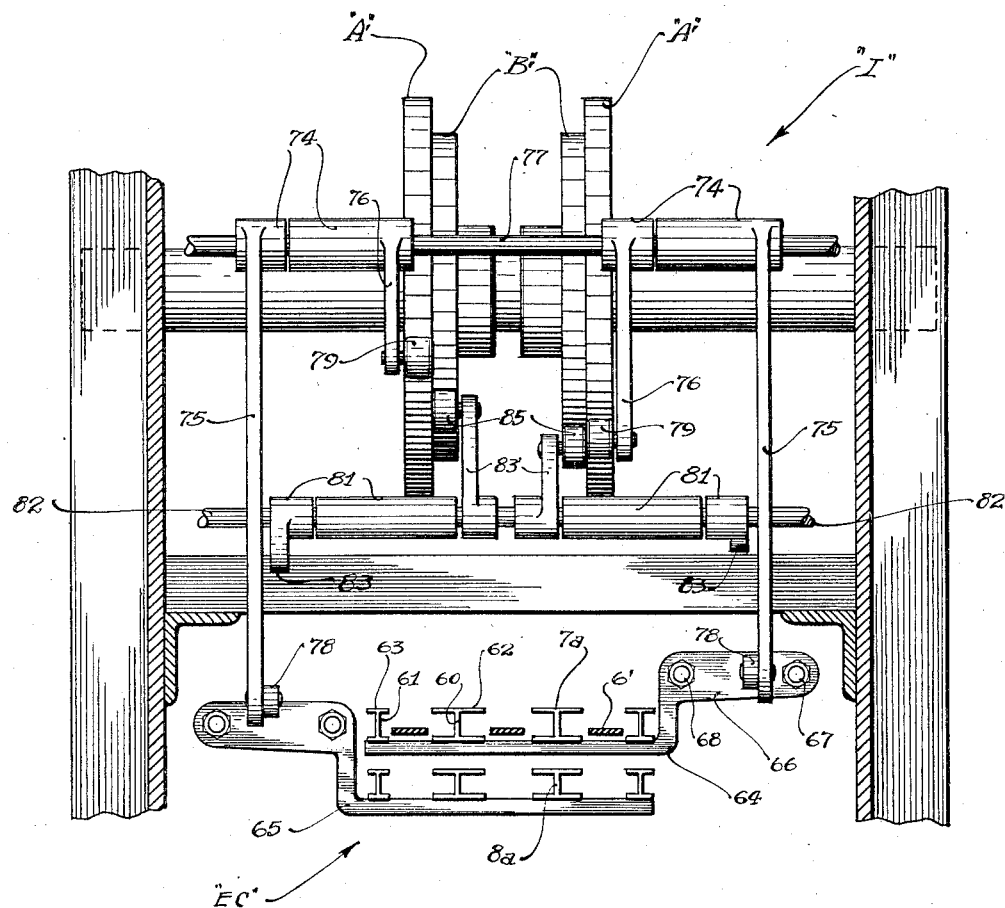
Fig. 14 is a partial, vertical view, in effect, a vertical, transverse view, of the apparatus shown in Fig. 13.

In Figures 13 and 14 there is shown a somewhat different form of intermediate receiving and delivering apparatus than that previously described. In said Figures 13 and 14, there is shown a substantially duplicate pair of intermediate receiving and delivering apparatus each of which is substantially the same. In other words, the construction of Figures 13 and 14 avoids employing what may be termed a long fork and short fork arrangement and instead it provides an arrangement where each fork can be made substantially alike, only one employs what may be termed a right hand arrangement whereas the other employs what may be termed a left hand arrangement.

In said Figures 13 and 14, the slicing machine is indicated by S′, the endless conveyor broadly by EC′ and the intermediate receiving and delivering mechanism (or mechanisms) as I′. The slicing machine and cutter therefor and the conveyor mechanism are substantially the same as those shown in Figures 1 to 3, the upper strands of the conveyor being indicated in Figure 14 by 6′. The conveying forks are respectively designated as 7a and 8a. These are provided by what may be considered as spaced longitudinally extending tine members. These tines, as they are arbitrarily called, are provided by members which appear to be I-shaped in Figure 14, to wit, members 60 and 61, the upper portion of each of which, to wit, members 62 and 63, extends horizontally and longitudinally. These members 60 and 61 are supported on transversely extending arms 64 and 65 as is clear from an inspection of Figure 14. There will first be described one set of the intermediate receiving and delivering mechanisms, to wit, the receiving and delivering mechanism shown at the right hand side of Figure 13. The fork-shaped member is collectively referred to as 7a and as previously indicated, it has tines or what is the equivalent to tines or longitudinally extending prongs which are provided by the members 60 and 61, respectively, having the supporting surfaces 62 and 63 which appear to be I-shaped in cross section in Figure 14. The transversely extending arm 64 has a main portion 66 that is fixedly secured to the forward ends of two longitudinally extending rods 67 and 68 that are in turn slidably mounted in bearings 69 and 70 of a vertical slider or sliding member 71 which in turn is slidably mounted on a fixed guideway 72. The rear ends of the rods 67 and 68 are connected by a yoke 73.

The forward longitudinal movement of the fork assembly 7a is accomplished through the medium of bell crank lever mechanism 74 which comprises an arm 75 and an arm 76 pivoted about the point 77. The lower free end of arm 75 is connected as by means of a link 78 to the yoke 73. The lower free end of arm 76 has a roller 79 in operative engagement with the cam A' and a spring 80 normally pulls the roller 79 so that it is continuously under the conjoint influence of the cam A' and of the spring whereby the spring furnishes the motive power for moving the feeding and delivering mechanism 7ª forwardly as it is allowed to so do under the influence of the cam A'. It will be noted that the shape of the cam is such as to allow of a progressive forward feed of the receiving and delivering mechanism controlled thereby during nearly the entire first half of its movement followed by a progressive return movement and a relatively quick final rearward movement near the end of the revolution of the cam. The slider or sliding member 71 is under the control of a bell crank lever 81 which is pivotally mounted on a fixed pivotal support at 82. This lever 71 has one end 83 thereof in engagement with a member 84 on the sliding member 71 so as to impart vertical movement to the latter and the lever 81 has an arm 83' with a roller 85 thereupon in operative engagement with cam B'. The shape of this cam B' is such that while the receiving mechanism 7ª is being given a forward movement, the cam B' through the medium of the lever supports the slideways 69 and 70 in their uppermost position until such time as the receiving member 7ª is in its full forward position after which there is a sudden drop in the cam surface B' whereby the sliding member 71 can drop to its lowest position, this movement is followed by a long low section of the cam B' whereby for a substantial period of the travel this low section of the cam indirectly supports sliding member 71 in its lowest position and while the receiving member 7ª is being returned because of the functioning effects of the cam A' on the parts operated thereby. During the latter part of the movement of the cam B', the receiving member 7ª is imparted a relatively sharp, vertical movement under the influence of a relatively steep portion of the cam B' which is then raising the sliding member 71 with the consequent result that there is an upward and rearward movement of the receiving member 7ª, this because the member 7ª is receiving not only an upward movement under the influence of cam B', but also a rearward movement under the influence of cam A'. The arrangement and operation of the receiving member 8ª is substantially the same as that for 7ª and it will also be observed that the construction of the parts 60 to 64 of each mechanism is such that while at one time one receiving and delivering member 7ª is being moved forwardly, the other receiving and delivering member 8ª can be moved rearwardly under the first mentioned member and so at another time the member 8ª can be moved forwardly while the member 7ª is being moved rearwardly under the member 8ª.

The foregoing functioning is enabled to be accomplished because of the members 64 and 65 being of opposite hand, one being supported and operated by and from mechanism which is located entirely at the right hand side of the machine while the other is supported and operated by and from mechanism which is located entirely at the left hand side of the machine. By this arrangement, it will be noted that the path of travel of the supporting and receiving member 7ª is exactly the same as the path of travel of the supporting and receiving member 8ª and that they are in effect exactly the same except one being of what might be termed a right hand type of construction while the other is of a left hand type of construction. Otherwise, the machine of Figures 13 and 14 functions practically the same as the machine or apparatus of Figures 1 to 12.

Figure 15:
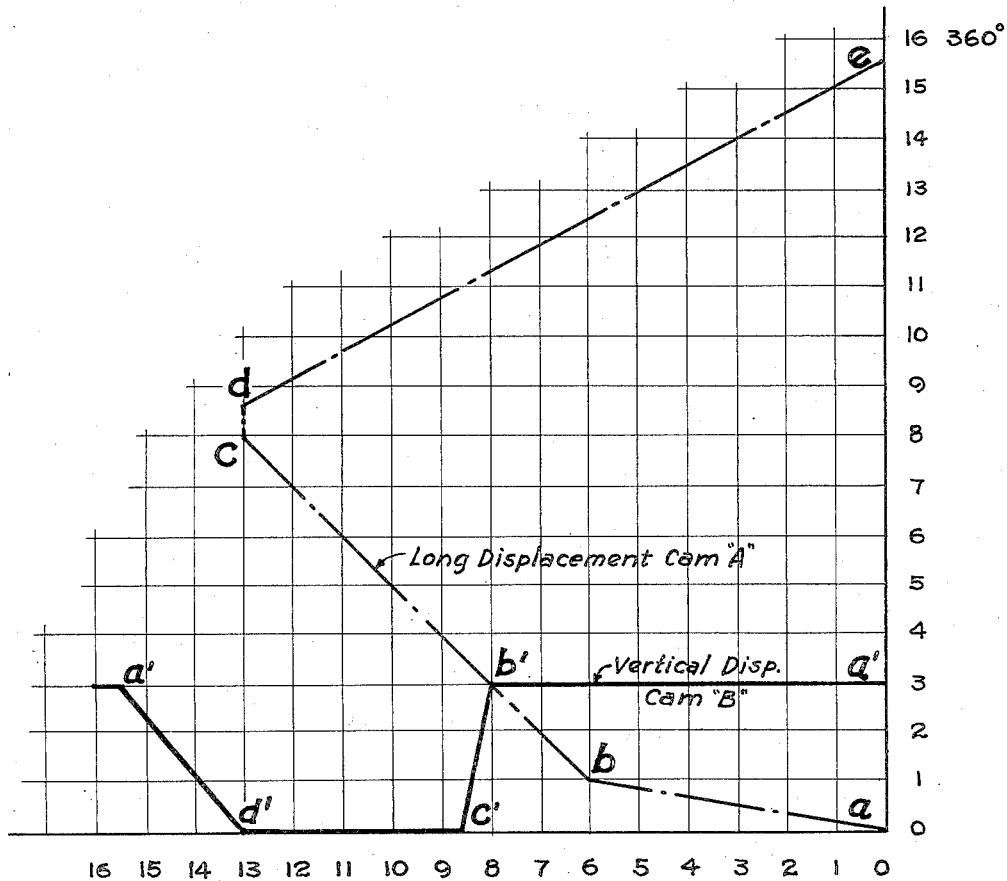
Fig. 15 is a view indicating diagrammatically the displacements or movements of each of the receiving and delivering members that follows from the functioning of the cams shown in Figs. 13 and 14.

Figure 15 has been included because it is indicative of the manner in which the cams A' and B' effect the movements and displacements of the different parts.

Where it is desirable to provide for the rapid and convenient changing of the number N in any group of slices, the following conditions must be provided for: (1) the gear ratio between the knife shaft 3 and the cam shaft 22 must be changeable to suit any value of N: (2) the horizontal displacement of the fork assemblies must be adjustable to suit the number of slices and the desired space between the individual slices. This can be brought about by adjusting the ratio of the length of lever elements 26—28 and 26—31; and (3) the length of track element 42 which determines the point at which pin 40 drops from the upper to the lower tracks must be adjustable.

What is claimed is:

1. A slicing machine comprising feeding means, a cutter at the forward delivery end thereof and means for operating the cutter characterized in that the machine is provided with an intermediate receiving and delivering mechanism having a fork-shaped element arranged to receive slices of bacon as severed by the cutter, a horizontally movable slide upon which the fork-shaped element is pivotally mounted, an arm rigidly connected to the fork-shaped element and having an end which swings about the axis of the pivotal connection between the fork-shaped element and the slide, the free end of which arm has a sliding pin that is associated with the guiding portions of a guiding member, and said guiding member which comprises an upper fixed longitudinally extending guiding portion at the rear, a latch member pivoted at its forward end and extending rearwardly toward the aforementioned fixed portion and providing an upper longitudinally extending guiding portion, a lower longitudinally extending guiding portion vertically spaced in respect to the latch member and extending forwardly beyond the forward end of the latch member, and an upwardly and rearwardly inclined guiding portion extending from the rear of the lower guiding portion to the upper fixed guiding portion, the latch member having the free rear end thereof normally resting upon the upwardly and rearwardly inclined guiding portion except when raised for permitting the sliding pin to pass thereunder when the sliding pin is moving along the upwardly and rearwardly inclined guiding portion.

2. A construction as defined in the claim last preceding in which the intermediate mechanism comprises two sets of slides, fork-shaped elements, guiding members, and operating mechanism therefore constructed for moving said fork-shaped members so that as one of the fork-shaped elements is being moved forwardly to receive slices of bacon as severed by the cutter the other fork-shaped element is being moved rearwardly preparatory to being brought into position for the succeeding operation of receiving bacon slices.

3. An intermediate receiving and delivering mechanism adapted for use on or in connection with slicing machines which mechanism comprises a longitudinally extending guide member, a sliding member mounted thereupon, a fork-shaped receiving and delivering member pivotally mounted upon the slide, a guide pin associated with the fork-shaped member whereby the position of the fork-shaped member is determined according to the position of the pin, and a guiding mechanism for said pin comprising a fixed short longitudinally extending upper guide section, a latch providing a long upper guide section, which latch is pivotally supported at its forward end, a long lower longitudinally extending guide section below the latch and extending forwardly beyond the forward end of the latch so as to receive the guide pin which drops thereupon after it has passed beyond the forward end of the latch, the space between the latch and said lower longitudinal guide section being sufficient to receive and permit passage of the pin as the latter is moved rearwardly along the lower longitudinally extending guide section, and an upwardly and rearwardly inclined guide section extending from the lower longitudinal guide section to the short fixed upper section, the arrangement being such that the free end of the latch rests upon this upwardly and rearwardly inclined guide section and also such that the sliding pin can pass under and lift the free end of the latch preparatory to passing to and upon the short upper longitudinal section, the construction also being such that upon the subsequent forward movement the sliding pin passes from the short upper section to and upon the upper guide section of the latch as the latter rests upon the upwardly and rearwardly inclined guide section.

4. A construction as defined in the claim last preceding in which the parts thereof are duplicated and in which there is operating mechanism therefor whereby when one of the fork members is being moved along a forward upper path the other fork member will be moved along a lower rearward path and whereby the fork-shaped members operate in succession one after the other through like cycles.

5. In a slicing machine, a cutter, means for feeding slabs of bacon to the cutter, an endless conveyor located below the cutter and having spaced strands, a pair of fork-shaped members operating between the strands of the conveyor, and means connected with the fork-shaped members for successively elevating each of the fork-shaped members above the conveyor and for moving each fork-shaped member forwardly between the cutter and the conveyor and beneath the cutter to receive a group of slices from the cutter and then downwardly below the conveyor to deposit the slices thereon and then rearwardly and upwardly to return the fork-shaped member to its initial position.

6. In a slicing machine, a cutter, means for feeding slabs of bacon to the cutter, an endless conveyor located below the cutter and having spaced strands, a pair of fork-shaped members operating between the strands of the conveyor, and means for successively elevating each fork-shaped member above the conveyor and for slowly moving the fork-shaped member forwardly between the cutter and the conveyor and below the cutter at a rate of speed less than that of the conveyor to receive a group of slices from the cutter in overlapping relation and then downwardly below the conveyor to deposit the slices thereon and then rapidly, rearwardly and upwardly to return the fork-shaped member to its initial position.

7. In a slicing machine, a cutter, means for feeding slabs of bacon to the cutter, an endless conveyor located below the cutter and having spaced strands, and an intermediate receiving and delivering mechanism comprising a pair of fork-shaped members operating between the strands of the conveyor, and means for guiding and actuating the fork-shaped members for successively elevating each of the fork-shaped members above the conveyor and for moving the fork-shaped member forwardly between the cutter and the conveyor and below the cutter to receive a group of slices from the cutter and then downwardly below the conveyor to deposit the group of slices thereon and then rearwardly and upwardly to return the fork-shaped member to its initial position.

8. In a slicing machine, a cutter, means for feeding slabs of bacon to the cutter, an endless conveyor located below the cutter and having spaced strands, and means for guiding and actuating the fork-shaped members for successively elevating each of the fork-shaped members above the conveyor and for moving the fork-shaped member forwardly between the cutter and the conveyor and below the cutter to receive a group of slices from the cutter and then downwardly below the conveyor to deposit the slices thereon and then rearwardly and upwardly to return the fork-shaped member to its initial position, said guiding and actuating means including longitudinal guides for slidably guiding the fork-shaped members in their backward and forward movements and approximately vertical guides for slidably guiding the fork-shaped members in their upward and downward movements.

9. In a slicing machine, a cutter, means for feeding slabs of bacon to the cutter, an endless conveyor located below the cutter and having spaced strands, a pair of fork-shaped members operating between the strands of the conveyor, and means connected with the fork-shaped members for successively elevating each of the fork-shaped members above the conveyor and for moving each fork-shaped member forwardly between the cutter and the conveyor and beneath the cutter to receive a group of slices from the cutter and then downwardly below the conveyor to deposit the slices thereon and then rearwardly and upwardly to return the fork-shaped member to its initial position, the latter means including upper and lower longitudinal guides for slidably guiding the fork-shaped members in their forward and backward movements and inclined guides extending from the lower longitudinal guides to the upper longitudinal guides for elevating the fork-shaped members from the lower guides to the upper guides.

10. In a slicing machine, a cutter, means for feeding slabs of bacon to the cutter, an endless conveyor located below the cutter and having spaced strands, a pair of pivoted fork-shaped members operating between the strands of the conveyor, and means connected with the fork-shaped members for successively elevating each of the fork-shaped members above the conveyor and for moving each fork-shaped member forwardly between the cutter and the conveyor and between the cutter to receive a group of slices from the cutter and then downwardly below the conveyor to deposit the slices thereon and then rearwardly to return the fork-shaped member to its initial position, the latter means including upper and lower longitudinal guides for slidably guiding the fork-shaped members in their forward and backward movements and means for swinging the fork-shaped members from the lower longitudinal guides to the upper longitudinal guides.

CHARLES T. WALTER.